United States Patent
Speker et al.

(10) Patent No.: US 12,103,106 B2
(45) Date of Patent: Oct. 1, 2024

(54) METHOD AND SYSTEM FOR LASER WELDING A MULTIPLICITY OF FOILS

(71) Applicant: TRUMPF Laser—und Systemtechnik GmbH, Ditzingen (DE)

(72) Inventors: Nicolai Speker, Pleidelsheim (DE); Marcel Schaefer, Burladingen (DE); Oliver Bocksrocker, Sachsenheim (DE); Guenter Ambrosy, Stuttgart (DE)

(73) Assignee: TRUMPF LASER-UND SYSTEMTECHNIK GMBH, Ditzingen (DE)

( * ) Notice: Subject to any disclaimer, the term of this patent is extended or adjusted under 35 U.S.C. 154(b) by 221 days.

(21) Appl. No.: 17/553,867

(22) Filed: Dec. 17, 2021

(65) Prior Publication Data

US 2022/0193823 A1     Jun. 23, 2022

(30) Foreign Application Priority Data

Dec. 21, 2020    (DE) .......................... 102020216393.6

(51) Int. Cl.
| | |
|---|---|
| B23K 26/22 | (2006.01) |
| B23K 26/00 | (2014.01) |
| B23K 26/24 | (2014.01) |
| B23K 26/60 | (2014.01) |
| B23K 101/36 | (2006.01) |

(52) U.S. Cl.
CPC ............ *B23K 26/24* (2013.01); *B23K 26/60* (2015.10); *B23K 2101/36* (2018.08)

(58) Field of Classification Search
CPC ............ B23K 26/244; B23K 2101/36; H01M 10/0525; H01M 10/04
See application file for complete search history.

(56) References Cited

U.S. PATENT DOCUMENTS

| | | | | |
|---|---|---|---|---|
| 3,287,195 A | * | 11/1966 | Piazze ................ | B29C 65/7437 493/341 |
| 3,509,990 A | * | 5/1970 | Piazze ................... | B65D 69/00 428/192 |
| 4,854,467 A | * | 8/1989 | Budenbender ......... | B21D 51/32 220/612 |
| 5,331,735 A | * | 7/1994 | Hotaling ................ | H01R 35/02 29/829 |

(Continued)

FOREIGN PATENT DOCUMENTS

| | | |
|---|---|---|
| CN | 110931835 A | 3/2020 |
| DE | 102017209059 A1 | 11/2017 |

(Continued)

*Primary Examiner* — Helena Kosanovic
*Assistant Examiner* — Lawrence H Samuels
(74) *Attorney, Agent, or Firm* — LEYDIG, VOIT & MAYER, LTD.

(57) ABSTRACT

A method for laser welding a multiplicity of foils onto a carrier includes arranging the foils one on top of the other to provide a foil stack, folding the foil stack to provide a folded region of the foil stack that protrudes up from two side regions of the foil stack, pressing the side regions against the carrier, and pressing together the side regions toward the folded region. The method further includes welding the foils to one another and to the carrier by directing a laser beam onto the folded region and moving the laser beam along the folded region.

15 Claims, 4 Drawing Sheets

(56) References Cited

U.S. PATENT DOCUMENTS

| | | | |
|---|---|---|---|
| 7,772,518 B2 * | 8/2010 | Rajesh | .................. B65B 7/2857 |
| | | | 219/121.64 |
| 10,411,227 B2 | 9/2019 | Sasaki | |
| 10,953,498 B2 | 3/2021 | Kobayashi et al. | |
| 2015/0314392 A1 * | 11/2015 | Haschke | ................ B23K 26/04 |
| | | | 219/121.64 |
| 2016/0141709 A1 | 5/2016 | Kim et al. | |
| 2018/0361516 A1 * | 12/2018 | Kobayashi | ......... B23K 35/0238 |
| 2022/0048129 A1 | 2/2022 | Boehm et al. | |

FOREIGN PATENT DOCUMENTS

| | | | |
|---|---|---|---|
| DE | 102018215943 A1 * | 3/2020 | |
| DE | 102018221843 A1 | 6/2020 | |
| EP | 3417984 A1 | 12/2018 | |
| JP | 2010016043 A * | 1/2010 | |
| JP | 2014136242 A * | 7/2014 | |
| KR | 20170119381 A * | 10/2017 | |
| WO | 2019245053 A1 | 12/2019 | |

\* cited by examiner

METHOD AND SYSTEM FOR LASER WELDING A MULTIPLICITY OF FOILS

CROSS REFERENCE TO RELATED APPLICATIONS

This application claims benefit to German Patent Application No. DE 10 2020 216 393.6, filed on Dec. 21, 2020, which is hereby incorporated by reference herein.

FIELD

The disclosure relates to a method for laser welding a multiplicity of foils onto a carrier, the foils being arranged one on top of the other, so that a foil stack is obtained. The disclosure also relates to a system with a laser beam source for laser welding a multiplicity of foils arranged in a foil stack onto a carrier.

BACKGROUND

Battery cells, for example of lithium-ion batteries, consist of a multiplicity of coated electrodes. The electrodes are in this case typically formed by foils, which are connected to a so-called collector. The collector forms a terminal lug, which is led out from the interior of the battery cell and thus makes it possible for the individual foils or electrodes to be electrically contacted together. In order to increase the capacity of such batteries, it is endeavored to increase the number of foils or electrodes per battery cell.

Various joining methods are used for connecting the foils to the collector. In the case of ultrasonic welding, the limited welding-in depth limits the number of possible foils per battery cell. In the case of known laser welding methods, there is the risk of the foils tearing at the border to the weld seam, in particular if the foils are stretched away from the weld seam.

SUMMARY

In an embodiment, the present disclosure provides a method for laser welding a multiplicity of foils onto a carrier. The method includes arranging the foils one on top of the other to provide a foil stack, folding the foil stack to provide a folded region of the foil stack that protrudes up from two side regions of the foil stack, pressing the side regions against the carrier, and pressing together the side regions toward the folded region. The method further includes welding the foils to one another and to the carrier by directing a laser beam onto the folded region and moving the laser beam along the folded region.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

The present disclosure provides for connecting a large number of foils to a carrier, in particular in an electrically conducting manner.

According to the present disclosure, a method is provided for laser welding a multiplicity of foils onto a carrier. Typically, all of the foils consist of the same, preferably metal, material. The foils are preferably aluminum foils or copper foils. Aluminum foils can be used as cathodes in battery cells. Copper foils can be used as anodes in battery cells.

The carrier typically consists of a metal material. Preferably, the carrier consists of a material with the same main alloying constituent as the foils. If the foils consist of an aluminum alloy, the carrier consequently preferably likewise consists of an aluminum alloy. If the foils consist of a copper alloy, the carrier consequently preferably likewise consists of a copper alloy. The carrier and the foils may contain further alloying constituents of the same amount in each case or of different amounts.

The carrier has in principle an upper side that is flat over some of its surface area. In particular, the carrier may take the form of a plate. In the region of the flat upper side, the foils are welded to the carrier. The carrier may be used as a so-called collector of a battery cell, in order to electrically contact the foils welded to it. Current flows through the carrier during the operation of the battery cell.

The method comprises the following steps:
A) arranging the foils one on top of the other, so that a foil stack is obtained,
B) folding the foil stack, so that a folded region of the foil stack protrudes up from two side regions of the foil stack,
C) pressing the side regions against the carrier and pressing together the side regions toward the folded region,
D) welding the foils to one another and to the carrier by directing a laser beam onto the folded region and moving the laser beam along the folded region.

Steps A), B) and C) are carried out one after the other in the specified sequence; step D) is carried out while step C) is continuing.

In step A), the foils are in other words stacked one on top of the other. The foil stack may comprise at least 10 foils, preferably at least 20 foils. The foil stack may comprise at most 300 foils, preferably at most 200 foils, particularly preferably at most 150 foils. In particular, the foil stack may comprise about 100 (90 to 110) foils. The individual foils may each be at least 2 µm thick, preferably at least 3 µm, particularly preferably at least 5 µm. The individual foils may each be at most 30 µm thick, preferably at most 20 µm.

During the folding in step B), the foil stack is three-dimensionally shaped. The folded region extends in principle between the two side regions. In other words, the side regions of the foil stack extend on both sides of the folded region and typically in or parallel to a common plane. The folded region typically protrudes perpendicularly from the side regions. In the folded region, the foil stack may be raised in the form of a bulge with respect to the side regions. The folded region may be formed in a way similar to a beading. The folded region defines a seam line along which the foils are welded to one another and to the carrier. Even after the folding, adjacent foils typically touch one another over their entire extent, and in particular in the folded region.

In step C), on the one hand the side regions of the foil stack are pressed against the carrier. This ensures that the film stack is in touching contact with the carrier. On the other hand, the side regions are pressed together toward the folded region. This achieves the effect that the foils touch one another in the region of the weld seam to be produced, i.e. in the folded region.

While the side regions are pressed against the carrier and toward one another, in step D) the foils are welded to one another and to the carrier. For this purpose, a laser beam is directed onto the folded region and moved along the folded region. The laser beam has the effect that the material of the foils is melted in the folded region. Similarly, the material of the carrier lying thereunder is melted. The folded region of the foil stack protruding up from the side regions provides additional material, which is melted by the laser beam and after solidifying helps to form the weld seam. The additional material from the folded region contributes to the weld seam being formed at least to the greatest extent without any gaps. The folding of the foil stack in the folded region has the effect of increasing the amount of material that is melted during the welding. There is no need for additional material to be added. The pressing together of the side regions toward the folded region or the weld seam that is produced is also conducive to gap-free welding. In particular, the pressing together can have the effect of avoiding the situation during welding in which the side regions move away from the molten pool in the welding zone. With the method according to the disclosure, it can consequently be ensured even when welding a large number of foils that a weld seam of a high quality is obtained, formed at least to the greatest extent without defects, in particular in the region of its transition into the (non-welded) side regions.

The laser beam used for the welding in step D) may have a wavelength of at least 400 nm, preferably at least 450 nm. The laser beam may have a wavelength of at most 650 nm, preferably at most 575 nm, particularly preferably at most 515 nm. Alternatively, the laser beam may have a wavelength of at least 800 nm and/or at most 1200 nm, for example 1030 nm or 1070 nm. The welding may take place with or, preferably, without inert gas support.

A laser power of the laser beam may be at least 1.5 kW, preferably at least 1.8 kW. The laser power of the laser beam may be at most 5 kW, preferably at most 3 kW.

A diameter of the laser beam on the foil stack may be at least 35 µm, preferably at least 340 µm. The diameter of the laser beam on the foil stack may be at most 1000 µm, preferably at most 600 µm.

A feed rate of the laser beam may be at least 1 m/min, preferably at least 4 m/min. The feed rate of the laser beam may be at most 20 m/min, preferably at most 6 m/min.

The method is preferably carried out with a device described below.

During the folding of the foil stack in step B), in a substep B1) the foil stack may first be drawn over a bending projection of a bending tool. As a result, the foil stack is bent up with respect to the side regions in the folded region. During the bending up, the foil stack may be elastically or partly plastically deformed. The bending projection is preferably conically formed. The bending projection typically protrudes up from side areas of the bending tool. The side areas of the bending tool may extend in a common plane.

For the bending up of the foil stack, the side regions of the foil stack may be pressed against side areas of the bending tool. In other words, the foil stack may be drawn over the bending projection, in that the foil stack is pressed toward the side areas of the bending tool. This makes the bending up of the foil stack in the folded region easier.

Preferably, after the bending up in substep B1), the foil stack is pressed together in the folded region in a substep B2). In other words, the bent-up regions of the foil stack are pressed against one another. As a result, in the folded region the foils align themselves parallel to one another and perpendicularly to the side regions. During the pressing together, the foil stack is in principle plastically deformed. Such a folded region is particularly advantageous with regard to the subsequent welding.

During the pressing together, the bending tool may be removed from the foil stack. In particular, the bending projection of the bending tool may slide out from the bent-up portion of the foil stack during the pressing together of the foil stack. The removal of the bending tool from the foil stack during (and not already before) the pressing together allows the bending tool to stabilize the foil stack during the pressing together. As a result, the situation in which gaps form between the foils in the folded region can be avoided.

By being divided into substeps B1) and B2), the folding of the foil stack can be carried out particularly easily, efficiently and precisely. In particular, the same pressing tool can be used for carrying out substeps B1) and B2).

In step C), in particular during the pressing together of the side regions toward the folded region, one of the side regions may lie against a fixed stop. The other side region may be pressed toward the stop. The fixed stop makes it easier to carry out step C) and reduces the amount of apparatus necessary for this. The fixed stop may be part of a holding-down arrangement.

Preferably, during the welding in step D), the side regions of the foil stack are moved toward one another. In other words, at least one of the side regions slides over the carrier and thereby moves toward the folded region. The foils are consequently pushed into the weld pool. The pushing has the effect that further material—in addition to the material of the folded region—is available for melting and being incorporated into the weld seam. As a result, a particularly stable attachment of each individual foil can be achieved. Tensile stresses in the foils in the region of the weld seam can be reliably avoided.

The scope of the present disclosure also includes a system for laser welding a multiplicity of foils arranged in a foil stack, in particular aluminum foils or copper foils, onto a carrier.

The system has a bending tool with a bending projection protruding up from side areas. The side areas of the bending tool may extend in a common plane. The bending tool with the bending projection makes it possible to bend up the foil stack with respect to its side regions in a folded region.

The system also has a pressing tool for pressing together the foils in the folded region. By pressing together the foils bent up by means of the bending projection, the effect can be achieved that the foils of the foil stack touch one another in flat contact in the folded region and protrude up from side regions of the foil stack.

Furthermore, the system has a holding-down arrangement. The holding-down arrangement serves for the pressing of side regions of the foil stack against the carrier and for the pressing of the side regions of the foil stack toward one another. The holding-down arrangement typically has two holding-down devices, in order in each case to press one of the side regions of the foil stack against the carrier. The pressing of the side regions against the carrier and toward one another can also be conducive to defect-free welding of the foils to the carrier.

Finally, the system has a laser beam source. The laser beam source may emit a laser pulse, which preferably has the parameters specified above. Directing a laser beam from the laser beam source onto the folded region of the foil stack pressed onto the carrier and pressed together by the holding-down arrangement allows the foils to be welded to one another and to the carrier.

The system makes it possible to carry out the method described above. The system may comprise a control device, which is set up to activate the pressing tool, the holding-down arrangement and the laser beam source for carrying out the method.

The bending projection of the bending tool may protrude at least 0.3 mm, preferably at least 0.5 mm, up from the side areas of the bending tool. The aforementioned projection may protrude at most 2 mm, preferably at most 1.5 mm, up from the side areas of the bending tool. It has been found that, when a bending projection of such dimensions is used, particularly good results can be achieved during the subsequent welding of the foils to one another and to the carrier.

The bending projection may have flanks that are inclined with respect to one another. In other words, the bending projection may be conically formed. The inclination of the flanks has the effect that the bending projection tapers away from the side areas. Preferably, the flanks include a flank angle of at least 30°, particularly preferably at least 40°, between one another. Preferably, the flanks include a flank angle of at most 80°, particularly preferably at most 70°, between one another. Most particularly preferably, the flank angle may be about 60° (55° to) 65°. Such a bending projection makes it easier to bend up the foils in the folded region and thereby retain or create flat contact of the foils against one another.

The pressing tool may have two jaws, which are movable toward one another and have jaw areas facing one another. With such a pressing tool, the foil stack can be efficiently and precisely pressed together in the folded region. Furthermore, the pressing tool may be used for bringing the foil stack to the carrier (after the pressing together).

Preferably, the jaw areas of the jaws are aligned parallel to one another. This can achieve the effect that, after the pressing together, the foils are aligned parallel to one another in the folded region. The jaw areas are advantageously aligned parallel to one another independently of an opening width of the pressing tool. As a result, damage to the foils during the pressing together can be avoided, in particular in the region of the transition from the folded region to side regions. Furthermore, a particularly uniformly compressed folded region can be obtained.

Ribs may protrude from the jaw areas. Preferably, the ribs of the two jaws are offset with respect to one another. This makes it easier for the pressing tool to securely hold the foil stack, in particular if the foil stack is intended to be removed from the bending tool when the foils are being pressed together and/or when the foil stack is being brought to the carrier.

Undersides of the jaws may extend in a common plane, preferably independently of an opening width of the pressing tool. With such a pressing tool, the side regions of the foil stack can be pressed against the carrier. This can make it easier for a holding-down arrangement to be subsequently placed onto the side regions of the foil stack.

The holding-down arrangement may have a movable pressure piece. The movable pressure piece makes it possible to press one of the side regions of the foil stack toward the other side region. Preferably, the movable pressure piece is formed on a holding-down device of the holding-down arrangement. This simplifies the construction and makes it easier for the holding-down arrangement to be activated.

Preferably, the holding-down arrangement has a fixed stop. The fixed stop forms an abutment when the movable pressure piece presses the side regions against one another or toward the folded region. The fixed stop allows a defined alignment and positioning of the foil stack ready for welding in an easy way.

As an alternative to the fixed stop, the holding-down arrangement may have a further movable pressure piece. Preferably, the further movable pressure piece is formed on a further holding-down device of the holding-down arrangement. Moving the two pressure pieces toward one another allows the side regions of the foil stack to be pressed together toward the folded region.

Further features and advantages of the disclosure are evident from the description and the drawing. According to the disclosure, the features mentioned above and those still to be further presented can be used in each case individually or together in any desired expedient combinations. The embodiments shown and described should not be understood as an exhaustive list, but rather as being of an exemplary character.

Figure 1:
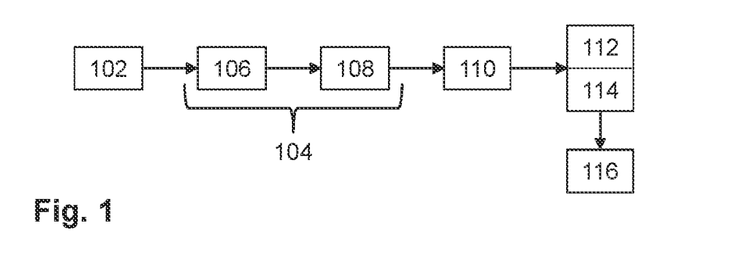
FIG. 1 shows a schematic flow diagram of a method for welding a multiplicity of foils onto a carrier.

FIG. 1 shows a flow diagram of a method for laser welding a multiplicity of foils onto a carrier.

In a first step 102, the foils are arranged one on top of the other in a foil stack. The foil stack may for example comprise 100 metal foils, in particular aluminum foils or copper foils, with a thickness of in each case 10 μm.

Then, the foil stack is folded in a step 104. During the folding of the foil stack, a folded region is created, protruding up from side regions of the foil stack arranged on both sides of the folded region. For the folding of the foil stack, it may be bent up in the folded region in a substep 106 and then pressed together in a substep 108. This is illustrated in FIGS. 2a to 4.

Figure 2A:
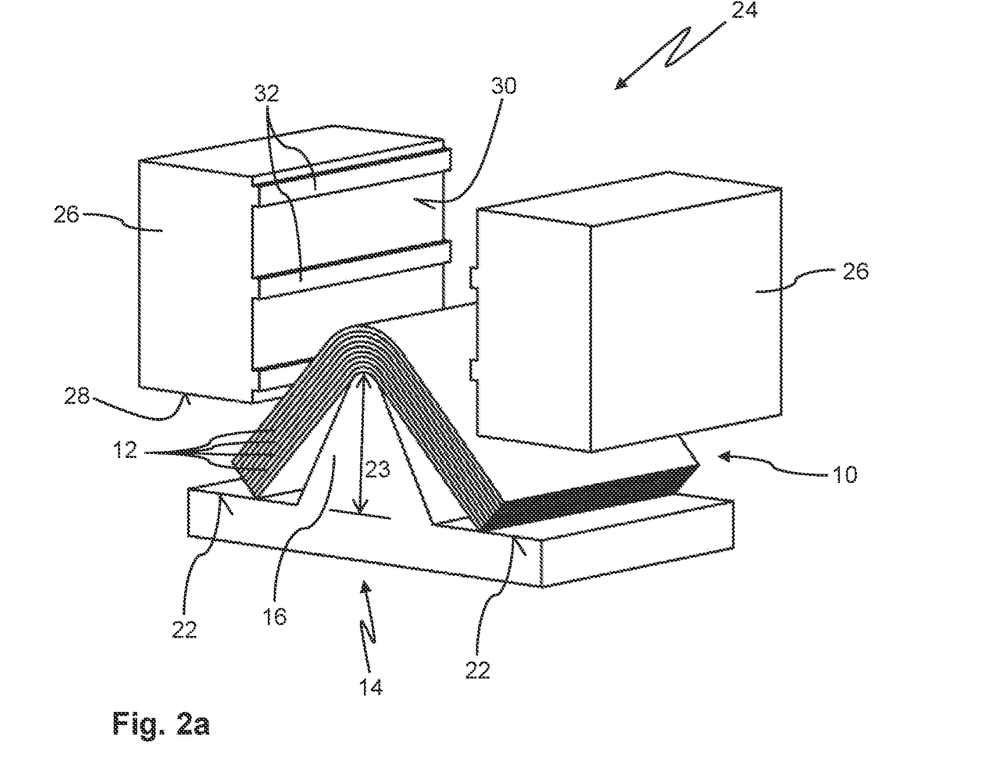
FIG. 2a shows a foil stack, which has been placed over a bending projection of a bending tool, a pressing tool with two jaws being arranged above the foil stack, in a schematic perspective view.
Figure 2B:
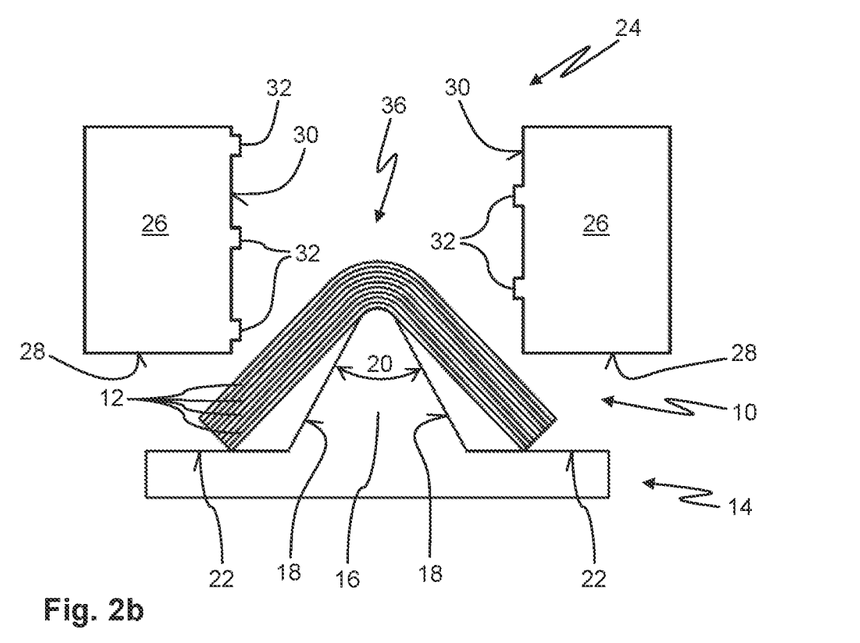
FIG. 2b shows the arrangement from FIG. 2a in a schematic side view.

FIGS. 2a and 2b show a foil stack 10, consisting of foils 12, the foil stack 10 having been placed onto a bending tool 14. The foils 12 of the foil stack 10 are shown shortened here; the foils 12 typically extend further to the right and left.

The bending tool 14 has a bending projection 16. The bending projection 16 may be conically formed. Flanks 18 of the bending projection 16 are inclined with respect to one another. A flank angle 20 of for example 55° may be included between the flanks 18. The bending projection 16 protrudes up from side areas 22 of the bending tool 14. The side areas 22 run here in a common plane. A height 23 of the bending projection 16 above the side areas 22 may be for example 1 mm.

In order to bend up the foil stack 10 by means of the bending tool 14, a pressing tool 24 may be used. The pressing tool 24 has two movable jaws 26. Undersides 28 of the jaws 26 run here in a common plane, independently of an opening width of the jaws 26.

The jaws 26 of the pressing tool 24 also have in each case a jaw area 30. The jaw areas 30 are facing one another. The jaw areas 30 may extend parallel to one another, independently of the opening width of the jaws 26. Protruding ribs 32 may be formed on the jaw areas 30. The ribs 32 of the two jaws 26 are arranged here offset with respect to one another, so that they do not meet one another during the closing of the jaws 26.

Figure 3:
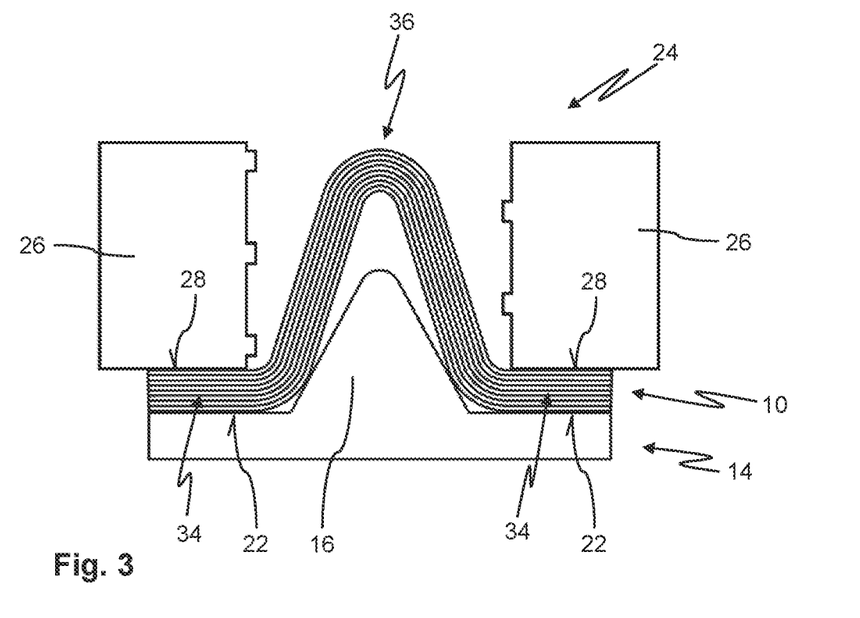
FIG. 3 shows the arrangement from FIG. 2a, 2b, side regions of the foil stack being pressed against side areas of the bending tool by undersides of the jaws of the pressing tool, so that the foil stack is bent up between the side regions by the bending projection, in a schematic side view.

In order to draw the foil stack 10 over the bending projection 16, the jaws 26 of the pressing tool 24 are moved toward the side areas 22 of the bending tool 14, compare FIG. 3. Side regions 34 of the foil stack 10 are thereby clamped between the undersides 28 of the jaws 26 and the side areas 22 of the bending tool 14. This may take place with a predefined force. According to FIG. 3, the foil stack 10 may be lifted off from the bending projection 16 in the apex region, for example in that, during the pressing down of the jaws 26, they are also moved toward one another. Typically, the jaws 26 are not however closed during the pressing down of the side regions 34; the foil stack 10 then lies largely flat against the bending projection 16 in the bent-up state.

Figure 4:
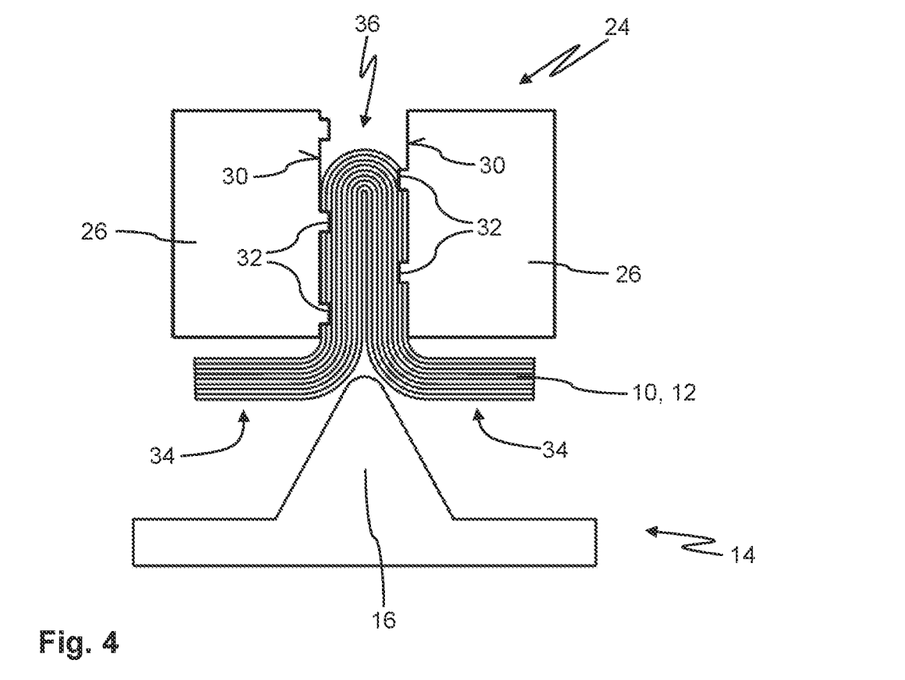
FIG. 4 shows the arrangement from FIG. 3, the jaws of the pressing tool having pressed together the foil stack, so that a folded region protruding up from its side regions has been obtained, and the pressing tool having been removed from the foil stack in the downward direction, in a schematic side view.

The result of the pressing together of the foil stack 10 in substep 108 is shown in FIG. 4. For the pressing together of the foils 12, the jaws 26 of the pressing tool 24 are moved toward one another. At the same time, the bending tool 14 with the bending projection 16 is removed from the foil stack 10 in the downward direction. In the folded state, the foils 12 may extend parallel to one another and perpendicularly to the side regions 34 in the folded region 36. The ribs 32 of the jaws 26 can press themselves into the outer foils 12. The jaws 26 can be pressed against one another or the foil stack 10 with a predefined force.

Figure 5:
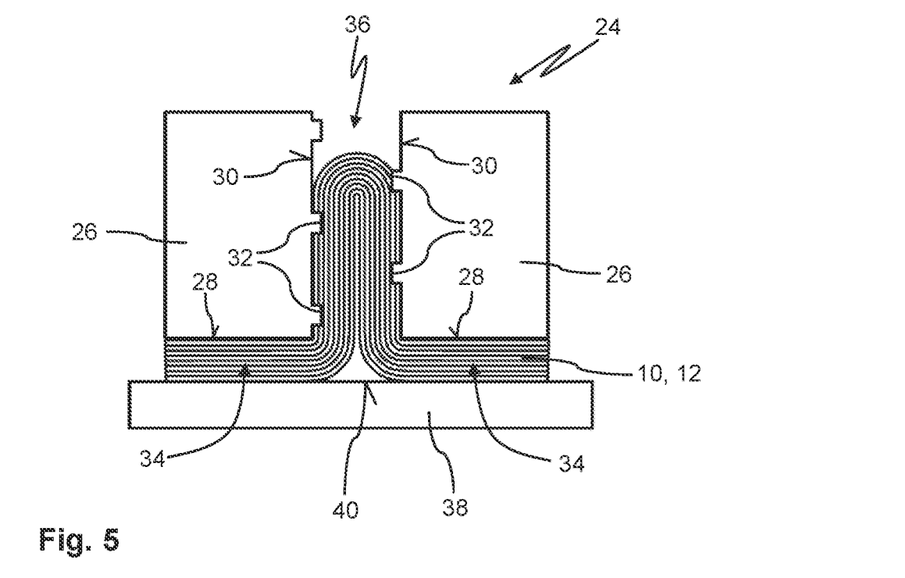
FIG. 5 shows a carrier, on which the folded foil stack has been arranged by means of the jaws of the pressing tool, in a schematic side view.

Then, in a step 110 (compare FIG. 1), the folded foil stack 10 is brought to a carrier 38, compare FIG. 5. The carrier 38 may be a metal plate, for example an aluminum plate or a copper plate, with an upper side 40 that is flat at least over some of its surface area. In order to bring the foil stack 10 to the carrier 38, the pressing tool 24 may be used. By means of the pressing tool 24, the side regions 34 of the foil stack 10 can be pressed onto the carrier 38. This may take place with a predefined force. Then, the pressing tool 24 is removed from the foil stack 10.

In order to obtain a weld seam of high quality during the welding of the foils 12 to one another and to the carrier 38, the side regions 34 of the foil stack 10 are pressed against the carrier 38 in a step 112 and pressed toward one another in a step 114, that is to say toward the folded region, compare FIG. 1. While steps 112 and 114 are continuing, the welding then takes place in a step 116.

Figure 6:
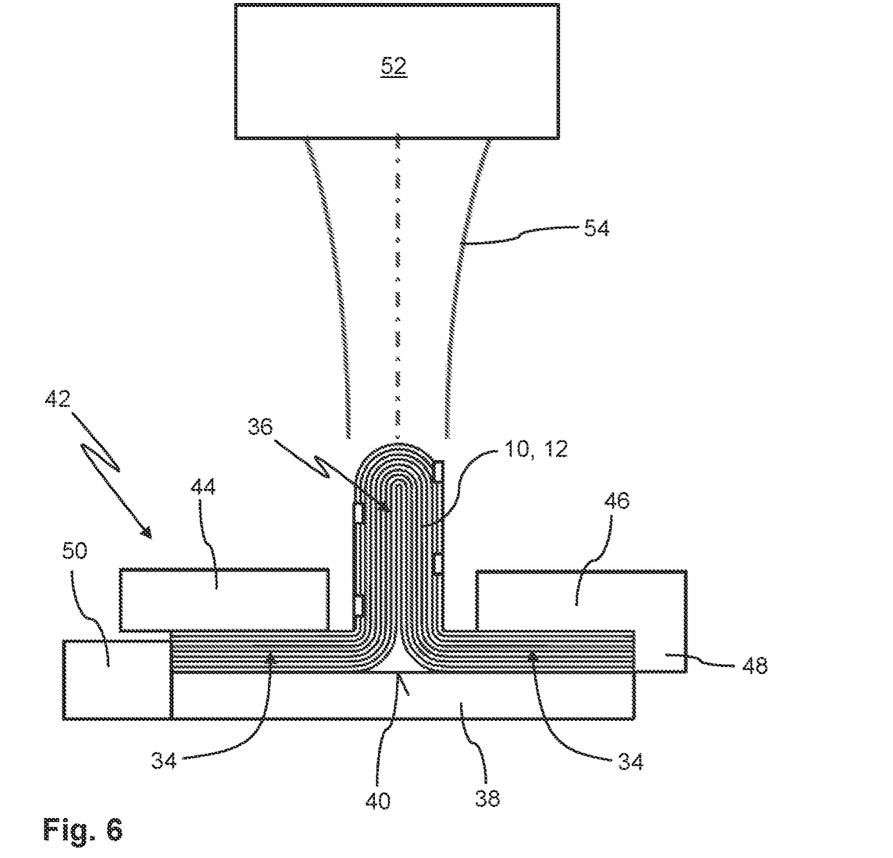
FIG. 6 shows the carrier and the foil stack from FIG. 5, two holding-down devices pressing the side regions of the foil stack against the carrier, one of the holding-down devices being formed with a movable pressure piece, which presses the foil stack toward a fixed stop on the other side of the folded region, and a laser beam having been directed onto the folded region, in a schematic side view.

In order to press the side regions 34 against the carrier 38 and toward one another, a holding-down arrangement 42 may be used, compare FIG. 6. The holding-down arrangement 42 has two holding-down devices 44, 46, which are movable perpendicularly to the upper side 40 of the carrier 38 and to the side regions 34 of the foil stack 10. The moving of the holding-down devices 44, 46 toward the carrier 38 has the effect that the side regions 34 of the foil stack 10 are pressed against the carrier 38 (step 112). This may take place with a predefined force.

The holding-down arrangement 42 also has a movable pressure piece 48. The pressure piece 48 is formed here on the holding-down device 46. The pressure piece 48 or the holding-down device 46 is movable parallel to the upper side 40 of the carrier 38 and parallel to the side regions 34 of the foil stack 10. The holding-down arrangement also has a fixed stop 50. The stop 50 is assigned to the holding-down device 44. In order to press together the side regions 34, against one another or toward the folded region 36, the pressure piece 48 is moved (here together with the holding-down device 46) toward the stop 50. As a result, the foil stack 10 is clamped between the stop 50 and the pressure piece 48 (step 114). This may take place with a predefined force.

For the welding in step 116, a laser beam 54 is directed from a laser beam source 52 onto the folded region 34 and is moved along the folded region 34. The foils 12 are thereby melted in the folded region 34. Furthermore, the carrier 38 underneath the folded region 34 is melted. The melting of the foils 12 has the effect of reducing their resistance to the force exerted by the pressure piece 48. The pressure piece 48 can therefore push the side region 34 assigned to it of the foil stack 10 into the molten pool produced. The melting of the folded region 36 and the pushing of the side region 34 have the effect that a large amount of material is available for the forming of a weld seam 56 without defects, in particular without gaps or pores, compare FIG. 7. The weld seam 56 can completely penetrate not only the foil stack 10 but also the carrier 38.

Figure 7:
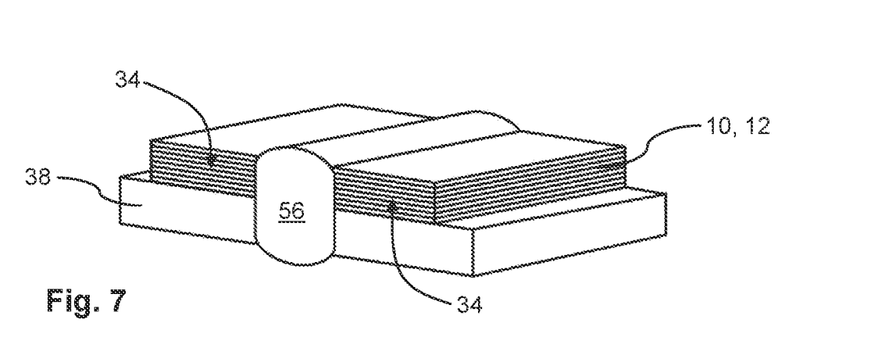
FIG. 7 shows the carrier under the foil stack from FIG. 6 after the welding, in a schematic perspective view.

The foils 12 welded to the carrier 38 may be used as electrodes in a battery cell. For this purpose, after the welding to the carrier 38, the side regions 38 of the foils 12 may be coated. The carrier 38 may serve as a so-called collector for the electrical contacting of the foils 12 and be led out from the battery cell.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

Foil stack 10
Foils 12
Bending tool 14
Bending projection 16
Flanks 18
Flank angle 20
Side areas 22
Height 23
Pressing tool 24
Jaws 26
Undersides 28
Jaw area 30
Ribs 32
Side regions 34
Folded region 36
Carrier 38
Upper side 40
Holding-down arrangement 42
Holding-down devices 44, 46
Pressure piece 48
Stop 50
Laser beam source 52
Laser beam 54
Weld seam 56
Stacking 102 the foils 12
Folding 104 the foil stack 10
Bending up 106 the foil stack 10
Pressing together 108 the foil stack 10
Bringing 110 the foil stack 12 to the carrier 38
Pressing 112 the foil stack 12 against the carrier 38
Pressing together 114 the side regions 34 of the foil stack 10
Welding 116

What is claimed is:

1. A method for laser welding a multiplicity of foils onto a carrier, the method comprising:
   A) arranging the foils one on top of the other to provide a foil stack,
   B) folding, via a bending tool, the foil stack to provide a folded region of the foil stack that protrudes up from two side regions of the foil stack,
   C) pressing, via a pressing tool, the foil stack together in the folded region and pressing, via a holding-down arrangement, the side regions against the carrier and toward the folded region, and
   D) welding the foils to one another and to the carrier by directing a laser beam onto the top side of the folded region, such that laser energy is transmitted from the top side of the folded region toward the carrier, and moving the laser beam along the folded region.

2. The method as claimed in claim 1, wherein, in step B), the foil stack is first drawn over a bending projection of the bending tool, so that the foil stack is bent up with respect to the side regions in the folded region.

3. The method as claimed in claim 2, wherein, for the bending up of the foil stack, the side regions of the foil stack are pressed against side areas of the bending tool.

4. The method as claimed in claim 2, wherein, after the bending up in substep B1), the foil stack is pressed together in the folded region in following step C), a substep B2), so that in the folded region the foils are aligned, in the folded region, parallel to one another and perpendicularly to the side regions.

5. The method as claimed in claim 4, wherein, during step C, the bending tool is removed from the foil stack.

6. The method as claimed in claim 1, wherein, in step C), one of the side regions lies against a fixed stop and the other side region is pressed toward the stop.

7. The method as claimed in claim 1, wherein, during the welding of the foils, the side regions of the foil stack are moved toward one another.

8. A system for laser welding a multiplicity of foils arranged in a foil stack onto a carrier, the system comprising:
   a bending tool with a bending projection protruding up from side areas, the bending tool configured to form a folded region of the foil stack that protrudes up from two side regions of the foil stack,
   a pressing tool configured to press the foil stack together in the folded region,
   a holding-down arrangement configured to press the side regions of the foil stack against the carrier and to press the side regions of the foil stack toward one another, and
   a laser beam source configured to direct a laser beam onto the top side of the folded region such that laser energy is transmitted from the top side of the folded region toward the carrier.

9. The system as claimed in claim 8, wherein the bending projection protrudes at least 0.3 mm and/or at most 2 mm up from the side areas of the bending tool.

10. The system as claimed in claim 8, wherein the bending projection has flanks that are inclined with respect to one another, the flanks including a flank angle of at least 30° and/or at most 80°.

11. The system as claimed in claim 8, wherein the pressing tool has two jaws configured to move toward one another and have jaw areas facing one another, the jaw areas of the jaws being aligned parallel to one another.

12. The system as claimed in claim 11, wherein ribs protrude from the jaw areas, the ribs of the two jaws being offset with respect to one another.

13. The system as claimed in claim 11, wherein undersides of the jaws extend in a common plane independently of an opening width of the pressing tool.

14. The system as claimed in claim 8, wherein the holding-down arrangement has a movable pressure piece, the movable pressure piece being formed on a holding-down device of the holding-down arrangement.

15. The system as claimed in claim 8, wherein the holding-down arrangement has a fixed stop.

* * * * *